United States Patent [19]

Ogawa et al.

[11] Patent Number: 4,671,115

[45] Date of Patent: Jun. 9, 1987

[54] ELECTRONIC SCANNING APPARATUS FOR ULTRASONIC IMAGING

[75] Inventors: Toshio Ogawa, Nishitama; Kageyoshi Katakura, Meguro, both of Japan

[73] Assignees: Hitachi, Ltd.; Hitachi Medical Corporation, both of Tokyo, Japan

[21] Appl. No.: 837,571

[22] Filed: Mar. 4, 1986

Related U.S. Application Data

[63] Continuation of Ser. No. 623,081, Jun. 21, 1984, abandoned.

[30] Foreign Application Priority Data

Jun. 24, 1983 [JP] Japan ................... 58-112764

[51] Int. Cl.$^4$ ............................ G01N 29/00
[52] U.S. Cl. ..................... 73/626; 73/628; 73/641
[58] Field of Search ............ 73/625, 626, 628, 641

[56] References Cited

U.S. PATENT DOCUMENTS

| 4,180,790 | 12/1979 | Thomas | 73/626 |
| 4,285,011 | 8/1981 | Sato | 73/626 |
| 4,319,489 | 3/1982 | Yamaguchi et al. | 73/626 |
| 4,372,323 | 2/1983 | Takemura et al. | 73/625 |
| 4,392,379 | 7/1983 | Yamaguchi | 73/626 |
| 4,448,075 | 5/1984 | Takemura et al. | 73/626 |
| 4,470,308 | 9/1984 | Hayakawa et al. | 73/626 |
| 4,472,973 | 9/1984 | Sugai et al. | 73/628 |
| 4,505,156 | 3/1985 | Questo | 73/626 |
| 4,519,250 | 5/1985 | Sumino | 73/626 |
| 4,528,854 | 7/1985 | Shimazaki | 73/626 |
| 4,550,606 | 11/1985 | Drost | 73/626 |

*Primary Examiner*—Howard A. Birmiel
*Attorney, Agent, or Firm*—Antonelli, Terry & Wands

[57] ABSTRACT

An electronic scanning apparatus ultrasonic imaging adapted to converge or deflect an ultrasonic beam by controlling the amplitude and phase of the vibration of each transducer in a transducer array consisting of a plurality of regularly-arranged transducers, and adapted to move the ultrasonic beam by selecting from all of the transducers constituting the transducer array at least one transducer forming a transmitting and receiving aperture. The apparatus includes bidirectional transmitter-receivers connected to the transducers constituting the transducer array, a first switch unit for selecting the bidirectional transmitter-receivers to form a transmitting and receiving aperture by connecting signal lines to the bidirectional transmitter-receivers, a second switch unit for connecting together the signal lines connected to the transducers which are in positions symmetrical with respect to the center of the transmitting and receiving aperture, and a transmitting and receiving beam former for phasing a plurality of transmitting signals and a plurality of receiving signals.

11 Claims, 9 Drawing Figures

|  | P1 | | P2 | | P3 | | P4 | |
|---|---|---|---|---|---|---|---|---|
| SW1 | ⓐ | b | a | ⓑ | ⓐ | b | a | ⓑ |
| SW2 | ⓒ | d | c | ⓓ | ⓒ | d | c | ⓓ |
| SW3 | ⓔ | f | ⓔ | f | e | ⓕ | e | ⓕ |
| SW4 | ⓖ | h | ⓖ | h | g | ⓗ | g | ⓗ |

| CONT / OUT | 1 | 2 | 3 | 4 | 5 | 6 | 7 | 8 | 9 | 10 |
|---|---|---|---|---|---|---|---|---|---|---|
| $\overline{O1}$ | I1 | I2 | I3 | I4 | I5 | I6 | I7 | I8 | I9 | I10 |
| $\overline{O2}$ | I2 | I3 | I4 | I5 | I6 | I7 | I8 | I9 | I10 | I1 |
| $\overline{O3}$ | I3 | I4 | I5 | I6 | I7 | I8 | I9 | I10 | I1 | I2 |
| $\overline{O4}$ | I4 | I5 | I6 | I7 | I8 | I9 | I10 | I1 | I2 | I3 |
| $\overline{O5}$ | I5 | I6 | I7 | I8 | I9 | I10 | I1 | I2 | I3 | I4 |
| $\overline{O6}$ | I6 | I7 | I8 | I9 | I10 | I1 | I2 | I3 | I4 | I5 |
| $\overline{O7}$ | I7 | I8 | I9 | I10 | I1 | I2 | I3 | I4 | I5 | I6 |
| $\overline{O8}$ | I8 | I9 | I10 | I1 | I2 | I3 | I4 | I5 | I6 | I7 |
| $\overline{O9}$ | I9 | I10 | I1 | I2 | I3 | I4 | I5 | I6 | I7 | I8 |
| $\overline{O10}$ | I10 | I1 | I2 | I3 | I4 | I5 | I6 | I7 | I8 | I9 |

ELECTRONIC SCANNING APPARATUS FOR ULTRASONIC IMAGING

This application is a continuation of application Ser. No. 623,081, filed June 21, 1984, now abandoned.

BACKGROUND OF THE INVENTION

This invention relates to an electronic scanning apparatus for ultrasonic imaging (which will hereinafter be called "ultrasonic imaging apparatus"), and more particularly to an ultrasonic imaging apparatus of a simpler construction.

An ultrasonic imaging apparatus is used to scan an object linearly or sectorwise by moving an ultrasonic beam while controlling the amplitude and phase of vibrations of arrayed transducers, and thereby take a tomograph of the object.

The construction of a conventional ultrasonic imaging apparatus will now be described with reference to FIG. 1.

Referring to FIG. 1, reference numeral 1 denotes arrayed transducers, 2 a switch unit for selecting a predetermined number of transducers, which determine a transmitting and receiving aperture, from the arrayed transducers, 3A a transmitting driver, 3B an amplifier for receiving signals, 4A, 4B second switch units for switching the data represented by the transmitting and receiving signals, 5A, 5B beam formers for phasing the transmitting and receiving signals, 6 a compressor-detector, and 7 a display.

As generally known, in the conventional ultrasonic imaging apparatus constructed as described above, a predeteremined number of transducers are selected from all of the arrayed transducers 1 by the first switch unit 2, and, the transmitting drivers 3A and the amplifier 3B for receiving signals, the numbers of which drivers and amplifiers are in agreement with that of the transducers to be selected. The second switch units 4A, 4B are connected to the transmitting driver 3A and amplifier 3B for receiving signals, respectively. These second switch units 4A, 4B are adapted to be switched periodically in accordance with the movement of the transmitting and receiving aperture, and capable of simultaneously connecting the transmitting or receiving signals in the two transducers which are symmetrical with each other with respect to the center of the transmitting and receiving aperture. Accordingly, a half of the whole of the transducers of the transmitting and receiving aperture may be phased by the beam formers 5A, 5B.

In the conventional ultrasonic imaging apparatus described above, it is necessary that the transmitting drivers and amplifiers for receiving signals, the numbers of which are in agreement with that of the transducers of the transmitting and receiving aperture, be provided, and that the second switch units and beam formers be provided for transmitting and receiving signals, respectively. This causes the dimensions and manufacturing cost of the apparatus to increase.

SUMMARY OF THE INVENTION

The present invention has been developed in view of the above-mentioned inconveniences. An object of the present invention is to provide a simply-constructed, miniaturized, economical ultrasonic imaging apparatus which is free from the above-mentioned problems encountered in a conventional ultrasonic imaging apparatus.

This object can be achieved by the ultrasonic imaging apparatus according to the present invention, which is adapted to converge or deflect an ultrasonic beam by controlling the amplitude and phase of the vibration of each transducer in a transducer array consisting of a plurality of regularly-arranged transducers, and to move the ultrasonic beam by selecting from all of the trasducers in said trasducer array a plurality of transducers forming a transmitting and receiving aperture, comprising a plurality of signal-transmitting and receiving means, each of which being connected to each of the transducers in said transducer array, respectively, and having the transmitting driving functions and receiving signal amplifying functions, a first switch means for selecting the signal transmitting and receiving means, to form a transmitting and receiving aperture, a second switch means adapted to receive as an input signal an output signal from the first switch means, to rotate the signal periodically and output the same therefrom, and to connect together the signal lines connected to the transducers which are in the positions symmetrical with respect to the center of the transmitting and receiving aperture, and a transmitting and receiving beam-forming means for phasing a plurality of transmitting signals and a plurality of receiving signals.

BRIEF DESCRIPTION OF THE DRAWINGS

FIGS. 3, 4, 5 and 7 show the examples of the detailed construction of various parts of the embodiment shown in FIG. 2, wherein:

FIG. 3 shows an example of the construction of a first switch unit;

FIG. 4 shows an example of the construction of a bidirectional transmitter-receiver;

FIG. 5 shows an example of the construction of a second switch unit; and

FIG. 7 shows an example of the construction of a transmitting and receiving beam former;

FIG. 6 is a diagram for use in describing an operation of the second switch unit shown in FIG. 5;

DESCRIPTION OF THE PREFERRED EMBODIMENT

An embodiment of the present invention will now be described in detail with reference to the drawings.

Figure 1:
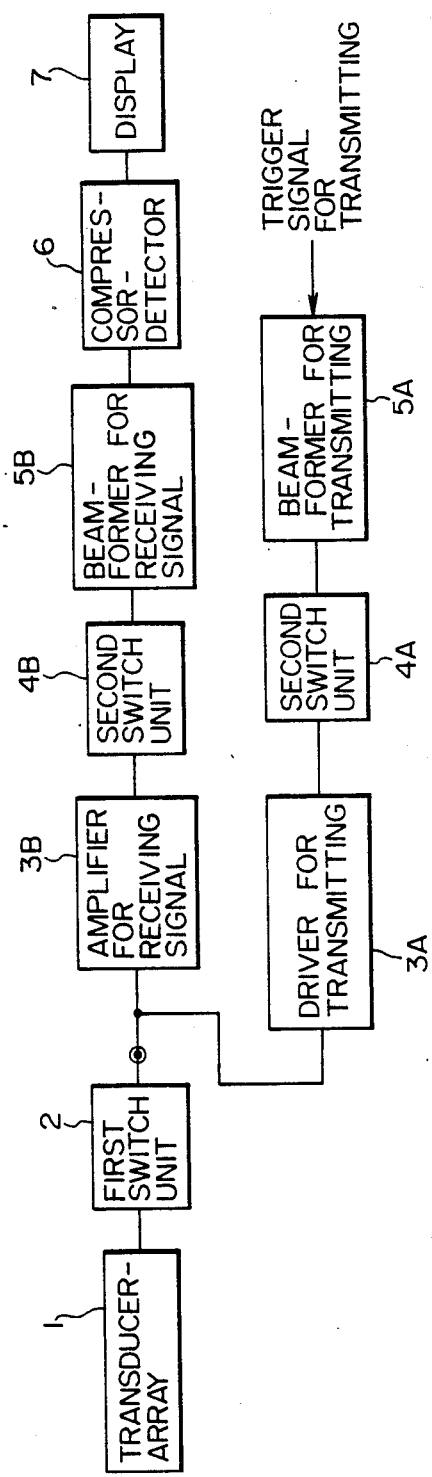
FIG. 1 is a block diagram showing the construction of a conventional ultrasonic imaging apparatus.
Figure 2:
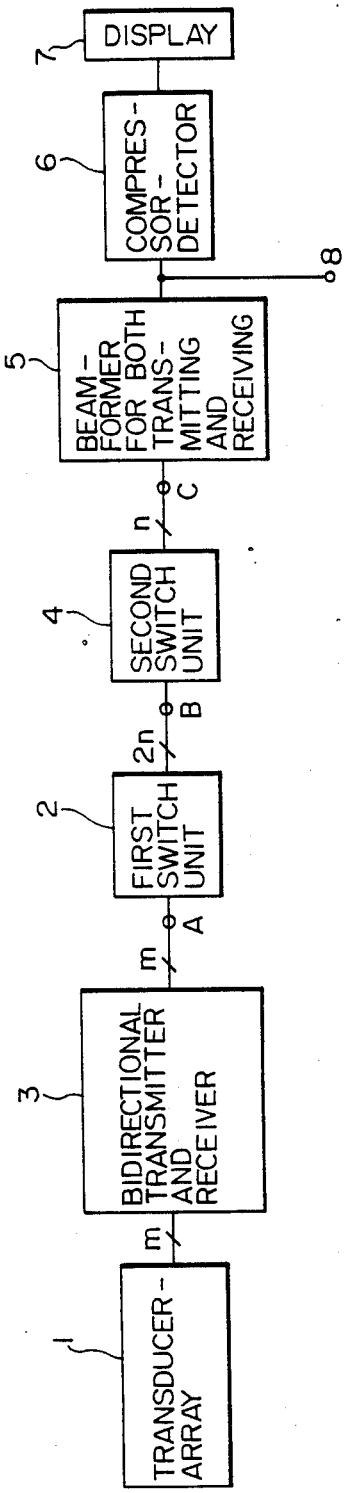
FIG. 2 is a block diagram of an embodiment of an ultrasonic imaging apparatus according to the present invention.

FIG. 2 is a block diagram of an embodiment of the present invention. The reference numerals 1, 2, 6 and 7 in the drawing designate the same constructional elements as the same reference numerals in FIG. 1, 3 a bidirectional transmitter-receiver, 4 a second switch unit for both transmitting and receiving signals, 5 a beam former for both transmitting and receiving signals, and 8 a transmitting trigger input terminal.

A transducer array 1 consists of m pieces (wherein m is a positive integer) in all of arrayed transducers, and a first switch unit 2 is adapted to select 2n pieces (wherein n is a positive integer) of transducers, which determine the transmitting and receiving aperture, from the arrayed transducers, both of the transducer array 1 and first switch unit 2 being known well. The bidirectional transmitter-receiver 3 is capable as will be described later of sending transmitting and receiving signals in the opposite directions.

Figure 3:
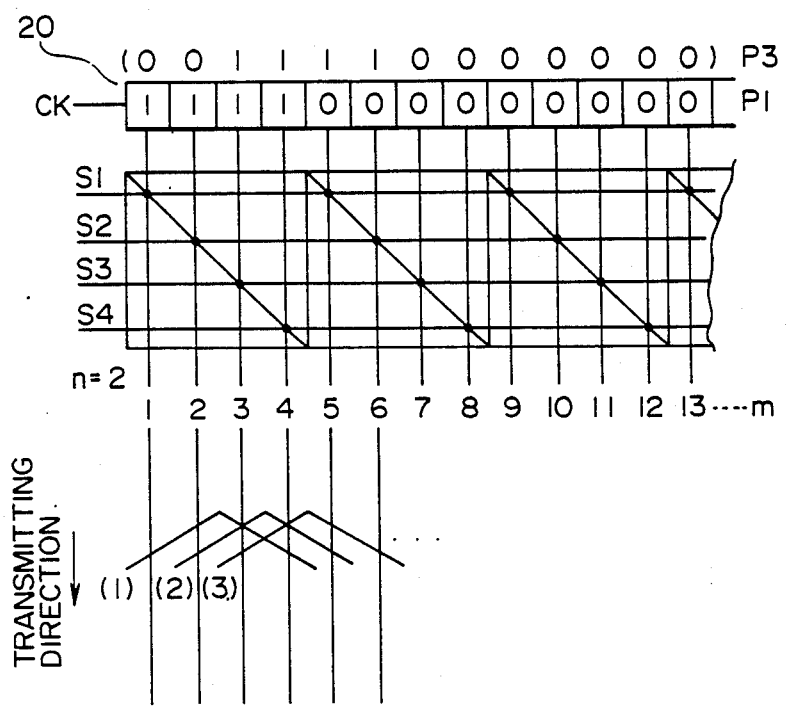

FIG. 3 shows an example of the construction of the first switch unit 2. In this example, n is 2, i.e. the transmitting and receiving aperture is 4. Referring to FIG. 3, the letter m=1, 2, . . . (shown up to 13 in the drawing) denotes transduers in an array. $S_1$-$S_4$ outputs of the first switch unit, and the numeral 20 a ring counter. The counter 20 is so formed that the (1111) pattern is moved to right in the drawing every time a control signal CK is generated. The control signal CK is a signal generated every time an ultrasonic beam is moved. When an output from the ring counter 20 is "1", the contacts on the intersections (designated by circles) of the outputs of the first switch unit 2 and the arrayed transducer m are turned on.

Figure 4:
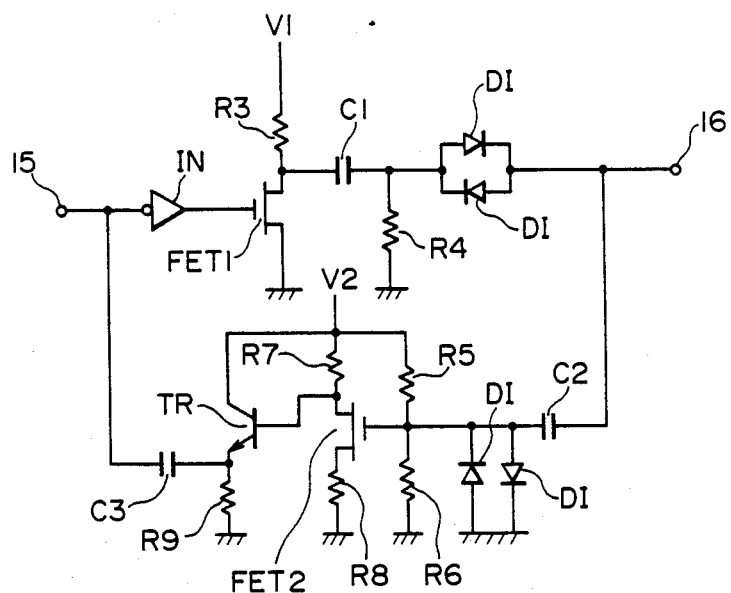

FIG. 4 is a circuit diagram showing an example of the construction of the bidirectional transmitter-receiver 3. Referring to the drawing, reference symbols FET1, FET2 represent field effect transistors, in which the former is used for a high voltage and high-speed operation with the latter used for a low-noise and high-frequency operation, TR a transistor, R3-R9 resistors, C1-C3 capacitors, DI a diode, IN an inverter circuit, V1 a high voltage of around 100 V, and V2 a low voltage of around 5 V, and reference numerals 15, 16 input and output terminals.

When a transmission control signal is inputted into the terminal 15 in the circuit constructed as described above, the field transistor FET1 is turned on through the inverter circuit IN, so that the energy accumulated in the capacitor C1 is outputted from the terminal 16 to drive the transducers in the transducer array 1.

In the meantime, a receiving signal is inputted into the terminal 16, amplified by the field transistor FET 2 and then impedance-converted by the transistor TR and is outputted from the terminal 15.

The bidirectional transmitter-receivers 3 the number of which is in agreement with that of all of the elements in the transducer array are provided. It is necessary that a bias current be applied constantly to the field effect transistor FET2 and transistor TR. This causes the power consumption and the temperature in a probe to increase. In order to prevent such inconveniences, the power source V2 for the field effect transistor FET2 and transistor TR is controlled by the first switch unit 2, so that the bias currents are supplied only to the field effect transistors (FET2) and the transistors (TR) which correspond to the transducers forming the transmitting and receiving aperture.

Figures 5, 6:
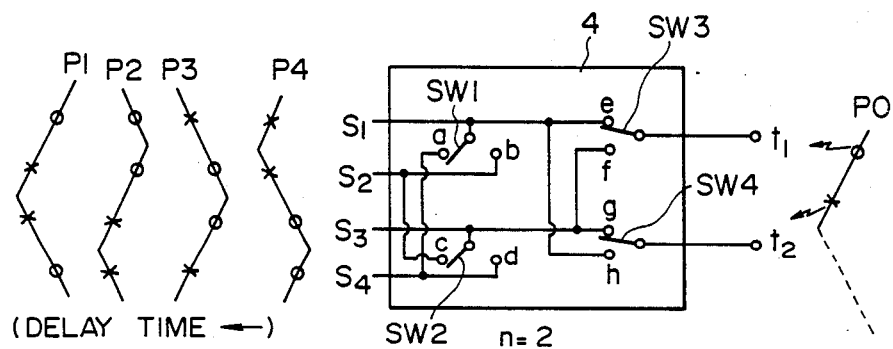

FIG. 5 shows an example of the construction of the second switch unit 4 for both transmitting and receiving signals. When n=2, there are four kinds of phase data, P1-P4. Therefore, these data can be formed into two kinds of patterns which are symmetrical with respect to the center of the transmitting and receiving aperture, owing to the construction shown in the drawing.

FIG. 6 shows the condition of the switches SW1-SW4 connected together, which correspond to the phases P1-P4. Referring to FIG. 6, the circles with which the letters a, b, . . . h denoting the contacts are enclosed indicate that these contacts are in an ON-state.

Figure 7:
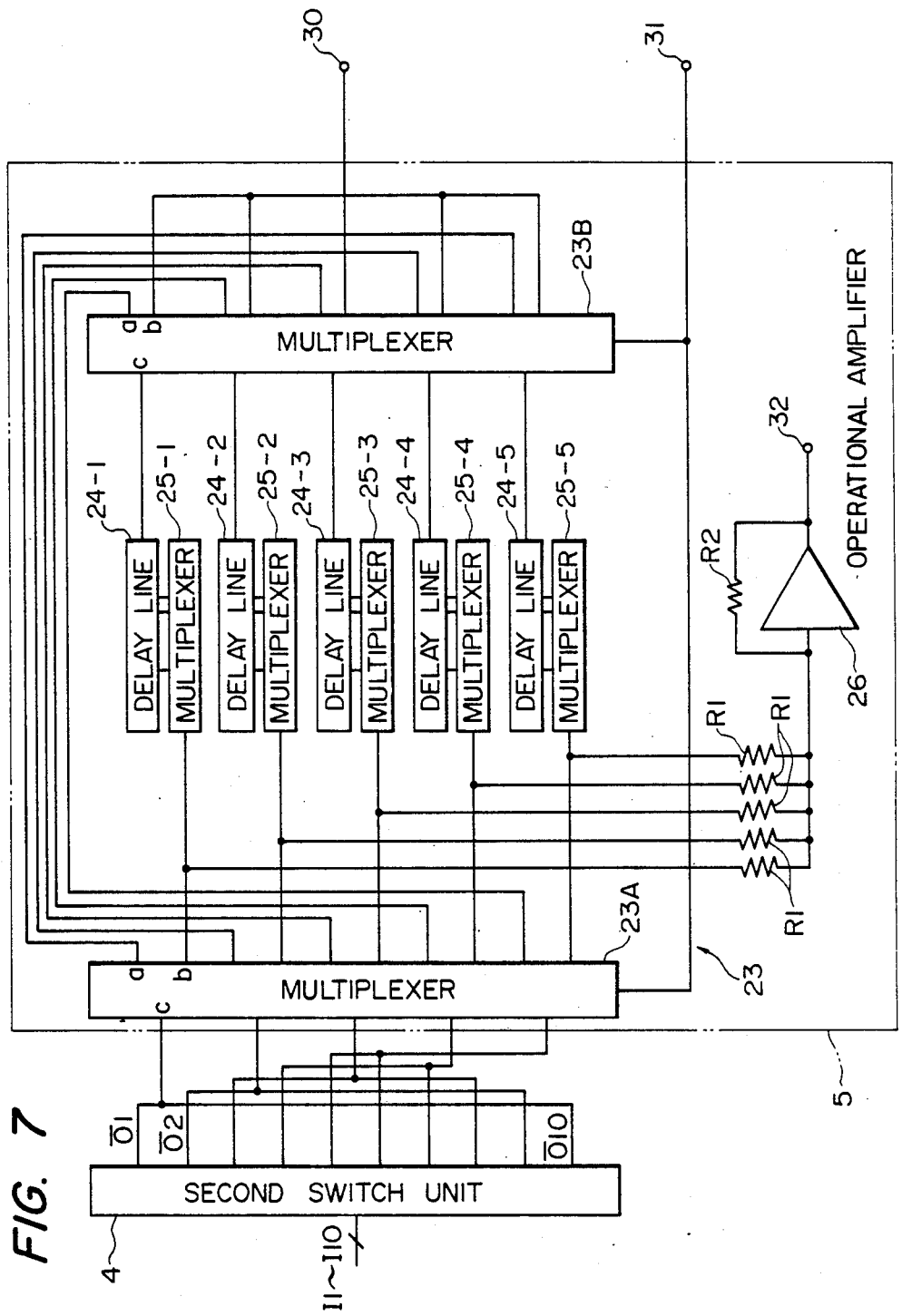

FIG. 7 shows an example of the construction of the transmitting and receiving beam former 5, in which n=5. Referring to the drawing, reference numeral 23 denotes a multiplexer with two inputs and one output for switching transmitting and receiving signals, which consists of two synchronously-operated portions 23A, 23B. When "1" is inputted into a control signal input terminal 31, the multiplexer 23 is put in a transmitting state, in which the terminals c, b therein are connected. When the control signal is "0", the multiplexer 23 is put in a receiving state, in which the terminals c, a therein are connected. Reference numeral 24-1~24-5 denote delay lines, 25-1~25-5 multiplexers with eight inputs and one output, 26 an operational amplifier, 30 a transmitting trigger input terminal, and 32 an output terminal for coherent receiving signals.

First, the transmitting of signals will be described. A control signal "1" is inputted into the control signal input terminal 31, and the terminals c, b in the multiplexer 23 are connected together. A transmitting trigger is inputted into the terminal 30, and a signal is outputted to the second switch unit 4 through the multiplexer 23B, delay lines 24-1~24-5, multiplexers 25-1~25-5 and multiplexer 23A. The multiplexers 25-1~25-5 shall be so selected that the transmitting beam converges.

The receiving of signals will now be described. A control signal "0" is inputted into the control signal input terminal 31, and the terminals c, a in the multiplexer 23 are connected together. A receiving signal is inputted into the terminal c in the multiplexer 23A to be inputted directly into the terminal a in the multiplexer 23B through the terminal a in the multiplexer 23A. The resultant signal is then inputted into the operational amplifier 26 through the terminal c in the multiplexer 23B, delay lines 24-1~24-5, and multiplexers 25-1~25-5. The signals inputted into the operational amplifier 26 are added to be outputted to the output terminal 32 and sent to the compressor-detector circuit 6 in the subsequent stage.

In the above description, the reference to the control signals for the multiplexers with eight inputs and one output 25-1~25-5 is omitted; when the necessary data, which have been stored in advance in a read-only memory, are read in order, the phases of transmitting and receiving signals can be controlled.

The operation of the embodiment constructed as described above of an ultrasonic imaging apparatus according to the present invention will now be described with reference to FIG. 2.

When a transmitting trigger is inputted into the input terminal 8, the phase data the number of which corresponds to ½ of the transmitting and receiving aperture are outputted from the transmitting and receiving beam former 5 to be sent to the second switch unit 4. In the second switch unit 4, these data are converted into phase data the number of which corresponds to the transmitting and receiving aperture, and the resultant data are outputted to the first switch unit 2, whereby 2n bidirectional transmitter-receivers corresponding to the transmitting and receiving aperture among a total of m pieces of bidirectional transmitter-receivers 3 are activated. Consequently, the transducers forming the transmitting and receiving aperture 2n among a total of m pieces of arrayed transducers are selected and driven to generate an ultrasonic beam.

In the meantime, the receiving signals are sent from all of the arrayed transducers m to a total of m pieces of corresponding bidirectional transmitter-receivers 3. As mentioned previously, an output from only such a bidirectional transmitter-receiver 3 that is selected by the first switch unit 2 is amplified by a preamplifier (not shown) in the bidirectional transmitter-receiver 3, and inputted into the second switch unit 4 through the first switch unit 2. In the second switch unit 4, the number of the input receiving signals is reduced to ½ due to the symmetry thereof with respect to the center of the receiving aperture, and the resultant signals are outputted to the transmitting and receiving beam former 5. These signals are phased by the transmitting and receiving beam former 5, and phased outputs are sent to the compressor-detector circuit 6 and indicated on the display 7.

The transmitting and receiving aperture is thereafter moved in order by the first switch unit 2, and the data are switched periodically by the second switch unit 4. Thus, the scanning can be done electronically with the ultrasonic beam moved in the direction of the arrangement of all of the arrayed transducers.

Referring to FIG. 2, the points A, B, C designated by circles on the signal line indicate the positions of cables connecting the probe and the body of the apparatus and the number of the signal lines required. For example, when a cable is disposed at the point A, i.e. when the probe is formed by the transducer array 1 and bidirectional transmitter-receivers 3, the number of signal lines is m. When a cable is disposed at the point B, i.e. when the probe is formed by the transducer array 1, bidirectional transmitter-receivers 3, and first switch unit 2, the number of signal lines is 2n. When a cable is disposed at the point C, i.e. when the probe is formed by the transducer array 1, bidirectional transmitter-receivers 3, first switch unit 2 and second switch unit 4, the number of signal lines is n.

The required length of a cable is usually around 3 m, at which the cable has a stray capacity of around 300 pF. Accordingly, the outputs from the transducers in the probe are received with a low impedance, so that it becomes difficult to obtain a high signal-receiving sensitivity. Such a phenomenon increases as the ulrasonic frequency increases.

However, when cables are disposed in the positions A, B, C in the embodiment shown in FIG. 2, all of the probes come to have bidirectional transmitter-receivers 3. Therefore, the above-mentioned phenomenon can be prevented, and the signal-receiving sensitivity of the apparatus can be improved as compared with that of a conventional apparatus of this kind. Especially, when a cable is disposed at the point C, the number of the signal lines can be reduced in addition to the above-mentioned effects since the second switch unit 4 is also contained in the probe.

Figures 8, 9:
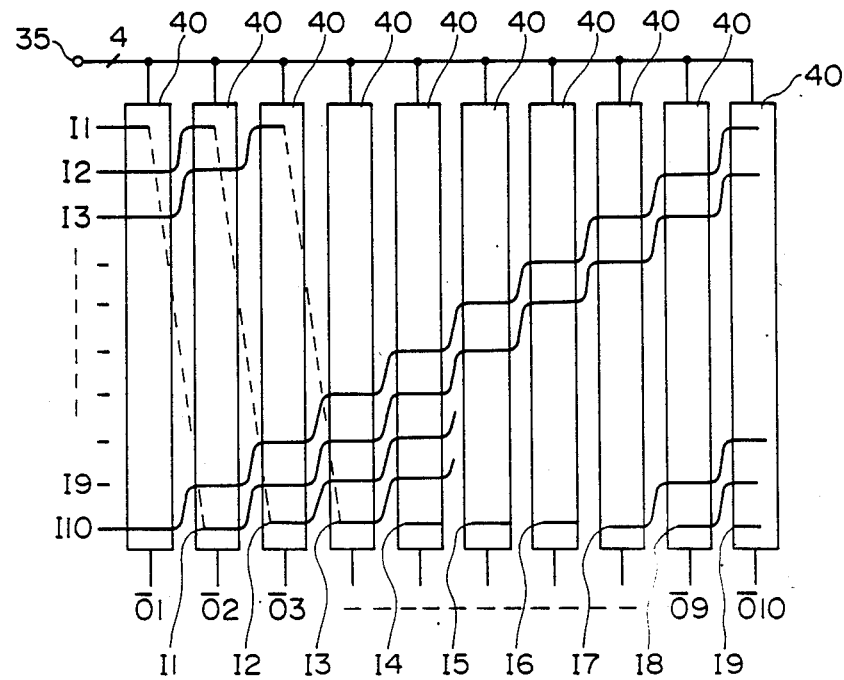
FIG. 8 shows another example of the construction of the second switch unit.
FIG. 9 is a diagram for use in describing an operation of the switch unit shown in FIG. 8.

FIG. 8 shows another example of the construction of the second switch unit 4. Referring to the drawing, reference symbols $I1 \sim I10$ denote input terminals, and $\overline{O1} \sim \overline{O10}$ output terminals, and reference numeral 35 an input terminal for 4-bit control signals, and 40 an analog multiplexer with ten input terminals and one output terminals. The input terminals $I1 \sim I10$ are connected to ten multiplexers 40 by wired OR circuits as shown in the drawing. It is clear that, when the control signals CONT vary to 1-10 (4 bits) as shown in FIG. 9 in the second switch unit having the above-described construction, the outputs $\overline{O1} \sim \overline{O10}$ can be obtained periodically. Namely, the data represented by the input signals $I1 \sim I10$ are rotated to be outputted to the output terminals $\overline{O1} \sim \overline{O10}$.

As described above, in the ultrasonic imaging apparatus according to the present invention, a bidirectional trasmitter-receiver having the transmitting signal-driving functions and receiving signal-amplifying functions is connected to all of the arrayed transducers, and a transmitting and receiving beam former and a transmitting and receiving second switch unit are used, whereby the selection of a transmitting and receiving aperture is done by a low voltage-operable switch unit with the same signal lines used for transmitting and receiving signals. Accordingly, this ultrasonic imaging apparatus and has a remarkable effect, i.e. it can be constructed simply to reduced dimensions at a very low cost.

We claim:

1. An electronic scanning apparatus for ultrasonic imaging adapted to converge or deflect an ultrasonic beam by controlling the amplitude and phase of the vibration of each transducer in a transducer array consisting of a plurality of regularly-arranged transducers provided in a probe, and adapted to move said ultrasonic beam by selecting a group of transducers forming a transmitting and receiving aperture from all of said transducers constituting said transducer array, comprising:
   a plurality of bidirectional signal-transmitting and receiving means, each of said bidirectional signal-transmitting and receiving means being provided in said probe and being directly connected to each of said transducers constituting said transducer array, respectively, each of said bidirectional signal-transmitting and receiving means having at least one transmitting driving element and at least one receiving signal amplifying element;
   transmitting and receiving beam-forming means for phasing a plurality of transmitting signals and a plurality of receiving signals; and
   switching means for selecting a group of said bidirectional signal-transmitting and receiving means and for connecting signal lines from said selected bidirectional signal-transmitting and receiving means so as to form a transmitting and receiving aperture;
   said bidirectional signal-transmitting and receiving means further including means for applying a bias current only to said at least one receiving signal amplifying element to said selected group of said bidirectional signal-transmitting and receiving means selected by said switching means, thereby enabling control of temperature within said probe.

2. An electronic scanning apparatus according to claim 1, wherein said at least one transmitting driving elements includes a transmitting field effect transistor and said receiving signal amplifying element includes a receiving field effect transistor and an impedance-converting transistor connected to said receiving field effect transistor.

3. An electronic scanning apparatus according to claim 2, wherein said means for applying a bias current applies a bias current only to said receiving field effect transistor and said impedance-converting transistor connected thereto in said selected group of said bidirectional signal-transmitting and receiving means.

4. An electronic scanning apparatus according to claim 1, wherein said plurality of transducers include m transducers, 2n transducers from all of said m transducers constituting said transducer array being selected to move said ultrasonic beam, where m>n, said plurality of bidirectional signal-transmitting and receiving means including m bidirectional signal-transmitting and receiving means, and m signal lines respectively connected to said m bidirectional signal-transmitting and receiving means, said switching means including first switch means associated with 2n signal lines for selecting 2n bidirectional signal-transmitting and receiving means from said m bidirectional signal-transmitting and receiving means by connecting said 2n signal lines respectively to selected ones of said m signal lines connected to said m bidirectional signal-transmitting and receiving means so as to form a transmitting and receiving aperture, and second switch means associated with n signal lines for connecting said n signal lines respectively to selected pairs of said 2n signal lines connected to said first switch means, each of said selected pairs of said 2n signal lines being connected to the selected 2n transducers which are in positions symmetrical with respect to the center of said transmitting and receiving aperture to said selected 2n bidirectional signal-transmitting and receiving means, said 2n signal lines and said first switch means, said transmitting and receiving beam-forming means being connected to said n signal lines connected to said second switch means.

5. An electronic scanning apparatus according to claim 4, wherein said second switch means includes a plurality of switch circuits and is adapted to form 2n phase data from n phase data.

6. An electronic scanning apparatus according to claim 4, wherein said second switch means consists of a plurality of multiplexers.

7. An electronic scanning apparatus according to claim 6, wherein said multiplexers each have a plurality of input terminals respectively connected to said signal lines and one output terminal.

8. An electronic scanning apparatus according to claim 4, wherein said transmitting and receiving beam-forming means includes first and second multiplexers each of which has two inputs and one output, and a plurality of combinations of a delay line and a multiplexer with a plurality of inputs and one output, which combinations connect said first and second multiplexers together.

9. An electronic scanning apparatus according to claim 4, wherein said m transducers and said m bidirectional signal-transmitting and receiving means are connected within said probe of said apparatus, said first and second switch means and said transmitting and receiving beam-forming means are connected to form a body of said apparatus, and said probe and said body are connected by cables comprising said m signal lines between said first switch means and said m bidirectional signal-transmitting and receiving means.

10. An electronic scanning apparatus according to claim 4, wherein said m transducers, said m bidirectional signal-transmitting and receiving means, and said first switch means are connected within said probe of said apparatus, said second switch means and said transmitting and receiving beam-forming means are connected to form a body of said apparatus, and said probe and said body are connected by cables comprising said 2n signal lines connecting said first and second switch means.

11. An electronic scanning apparatus according to claim 4, wherein said m transducers, said m bidirectional signal-transmitting and receiving means, and said first and second switch means are connected within said probe of said apparatus, said transmitting and receiving beam-forming means forming a body of said apparatus, and said probe and said body are connected by cables comprising said n signal lines connecting said transmitting and receiving beam-forming means and said second switch means.

* * * * *